United States Patent
Deng (10) Patent No.: US 11,449,756 B2
(45) Date of Patent: Sep. 20, 2022

(54) METHOD TO BALANCE SPARSITY FOR EFFICIENT INFERENCE OF DEEP NEURAL NETWORKS

(71) Applicant: Samsung Electronics Co., Ltd., Suwon-si (KR)

(72) Inventor: Weiran Deng, Woodland Hills, CA (US)

(73) Assignee: SAMSUNG ELECTRONICS CO., LTD.

(*) Notice: Subject to any disclaimer, the term of this patent is extended or adjusted under 35 U.S.C. 154(b) by 900 days.

(21) Appl. No.: 16/186,470

(22) Filed: Nov. 9, 2018

(65) Prior Publication Data
US 2020/0097830 A1   Mar. 26, 2020

Related U.S. Application Data

(60) Provisional application No. 62/735,846, filed on Sep. 24, 2018.

(51) Int. Cl.
*G06N 3/08* (2006.01)

(52) U.S. Cl.
CPC .................... *G06N 3/084* (2013.01)

(58) Field of Classification Search
CPC ........ G06N 3/084; G06N 5/022; G06N 3/082; G06N 3/0427; G06N 3/0454; G06N 3/063; G06N 3/0472; G06N 3/08; H04N 13/302; H04N 13/398; G09G 3/20; G09G 5/363; G09G 3/3426; G06K 9/66; G06K 9/6256; G06K 9/6262; G06K 9/46; H04L 27/2614; H04B 17/345; H04B 17/3912; H04B 17/309; H04B 17/26; H04B 17/336; H04B 17/364; H04B 17/354; G06F 17/3053; G06F 17/16; G06F 17/30867; G06F 16/9535; G06F 16/24578; G06F 7/582; G06Q 50/30; G06Q 10/047; G06T 11/006;
(Continued)

(56) References Cited

U.S. PATENT DOCUMENTS

| | | | |
|---|---|---|---|
| 8,315,962 B1 * | 11/2012 | Horne | A61B 5/055 |
| | | | 706/22 |
| 8,700,552 B2 | 4/2014 | Yu et al. | |
| 9,780,985 B1 * | 10/2017 | Tom | H04L 5/0007 |

(Continued)

FOREIGN PATENT DOCUMENTS

WO   2018058509 A1   4/2018

OTHER PUBLICATIONS

Han, Song et al., "EIE: Efficient Inference Engine on Compressed Deep Neural Network", International Symposium on Computer Architecture (ISCA), May 3, 2016, 12 pages.

*Primary Examiner* — Mouloucoulaye Inoussa
(74) *Attorney, Agent, or Firm* — Renaissance IP Law Group LLP (57) ABSTRACT

A system and method that provides balanced pruning of weights of a deep neural network (DNN) in which weights of the DNN are partitioned into a plurality of groups, a count of a number of non-zero weights is determined in each group, a variance of the count of weights in each group is determined, a loss function of the DNN is minimized using Lagrange multipliers with a constraint that the variance of the count of weights in each group is equal to 0, and the weights and the Lagrange multipliers are retrained by back-propagation.

13 Claims, 4 Drawing Sheets

(58) Field of Classification Search
CPC ..... G06T 11/003; A61B 6/5223; A61B 6/032; A61B 6/5205
USPC ..................... 345/419; 382/159, 131; 706/12
See application file for complete search history.

(56) References Cited

U.S. PATENT DOCUMENTS

| | | | |
|---|---|---|---|
| 10,740,434 B1* | 8/2020 | Duong | G06T 1/20 |
| 2012/0019529 A1* | 1/2012 | Kimpe | H04N 13/302 |
| | | | 345/419 |
| 2017/0206201 A1* | 7/2017 | Chidlovskii | G06Q 10/025 |
| 2018/0046914 A1 | 2/2018 | Li et al. | |
| 2018/0046915 A1* | 2/2018 | Sun | G06N 3/0445 |
| 2018/0107926 A1* | 4/2018 | Choi | G06N 3/0472 |
| 2018/0114114 A1 | 4/2018 | Molchanov et al. | |
| 2019/0244362 A1* | 8/2019 | Movshovitz-Attias | |
| | | | G06T 7/136 |
| 2020/0074642 A1* | 3/2020 | Wilson | G06T 7/194 |

* cited by examiner

METHOD TO BALANCE SPARSITY FOR EFFICIENT INFERENCE OF DEEP NEURAL NETWORKS

CROSS-REFERENCE TO RELATED APPLICATION

This application claims the priority benefit under 35 U.S.C. § 119(e) of U.S. Provisional Application No. 62/735,846 filed on Sep. 24, 2018, the disclosure of which is incorporated herein by reference in its entirety.

TECHNICAL FIELD

The subject matter disclosed herein relates to neural networks. More specifically, the subject matter disclosed herein relates to a system and a method to provide balanced pruning of weights of a deep neural network (DNN).

BACKGROUND

Neural hardware is designed to accelerate the compute of deep neural networks. Nevertheless, hardware accelerators are not efficient at processing sparse parameters, and balancing the sparsity of the neural network parameters to ensure the parallel processing elements have same amount workloads is a difficult problem. Sparsity is used to reduce the parameter size and to increase computing efficiency in deep neural networks.

SUMMARY

An example embodiment provides a system to provide balanced pruning of weights of a deep neural network (DNN) that may include a weight masker and a loss determiner. The weight masker may mask weights in each group of weights of a plurality of weight groups of the DNN to generate, and the loss determiner may determine a loss of the DNN based on a network loss of the DNN minus a variance of a count of non-zero weights in the plurality of weight groups. In one embodiment, the loss determiner may further determine the loss of the DNN based on the network loss of the DNN minus the variance of the count of non-zero weights in the plurality of weight groups multiplied by a Lagrange multiplier. In another embodiment, the weight masker may multiply weights in each group of weights by a masking function. In still another embodiment, the masking function may be differentiable.

An example embodiment provides a method to provide balanced pruning of weights of a deep neural network (DNN) that may include: partitioning weights of the DNN into a plurality of groups; applying by a weight masker a masking function to weights in each group; determining a count of a number of non-zero weights in each group after the masking function has been applied; determining a variance of the count of non-zero weights in each group; minimizing by a loss determiner a loss function of the DNN using a Lagrange multiplier with a constraint that the variance of the count of non-zero weights in each group is equal to 0; and retraining the weights and the Lagrange multiplier by back-propagation. In one embodiment, the Lagrange multiplier may be used to multiply the variance of the count of non-zero weights in each group. In another embodiment, post processing may include: determining a mode of the retrained weights; if a group of the plurality of groups has more non-zero weights after balanced pruning, adjusting the masking function applied to the group to be 0 until a count of non-zero weights of the group equals the mode of the retrained weights; and if a group of the plurality of groups has fewer non-zero weights after balanced pruning, adjusting the masking function applied to the group to be 1 until a count of non-zero weights of the group equals the mode of the retrained weights.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein. Additionally, the described aspects can be implemented to perform low power, 3D-depth measurements in any imaging device or system, including, but not limited to, a smartphone, a User Equipment (UE), and/or a laptop computer.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout,"

etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein relates to a method and a system that sparsifies the weights of a deep neural network (DNN). The sparsity of a DNN model processed using the subject matter disclosed herein has the same number of non-zero weights for each group. The group may be created based on the DNN hardware architecture and may depend on how activations and weights are fetched from the memory to the processing elements. During the training stage, the DNN model weights and weight threshold parameters are trained simultaneously so that the DNN model may reach a maximum training accuracy and a minimal number of non-zero weights. At the same time, the number of non-zero weights within each group is approximately same by enforcing the variance of the number of non-zero weights between groups to be close to zero. At the end of training, a post-processing procedure may be applied to achieve a result that each group has exactly same number of non-zero weights as a perfectly balanced sparsity.

The subject matter disclosed herein provides an automated pruning method that simultaneously trains the parameters, reduces the number of non-zero parameters, and balances the number of non-zero parameters for hardware processing elements to increase the utilization rate of processing elements of the system. A post-processing step at the end of training to adjust weights such that all groups have the exact same of number of weights to achieve a perfect balance of non-zero weights.

The training of a DNN model may be a numerical optimization problem that seeks a set of weight parameters that make the predictions with minimal difference to the ground truth. The minimization problem may be written as:

$$\underset{w}{\operatorname{argmin}}(L_{net}) \tag{1}$$

in which $L_{net}$ is the network error, i.e., the difference between the prediction and the ground truth t, that is, $$L_{net} = [y_{(L)} - t]^2 \tag{2}$$

in which $y_{(L)}$ is the output from the last layer, and L is the number of layers.

To enforce the sparsity, a pruning function may be applied to the weights so that the weights having magnitudes below a threshold are set to 0 and the weights having a magnitude above the threshold are not affected. In order to have trainable pruning functions, the function needs to be differentiable to a first order. In one embodiment, a threshold function, or pruning function, that may be used is $$h(w) = \frac{w}{1 + \frac{\exp(-\beta^2 w^2)}{\alpha^2}}. \quad (3)$$

in which w is a weight value of a neural network, $\alpha$ is a parameter that controls a sharpness of the threshold function h(w), and $\beta$ is a parameter that controls a distance between the first and second edges or, in other words, a width of the threshold.

Figure 1:
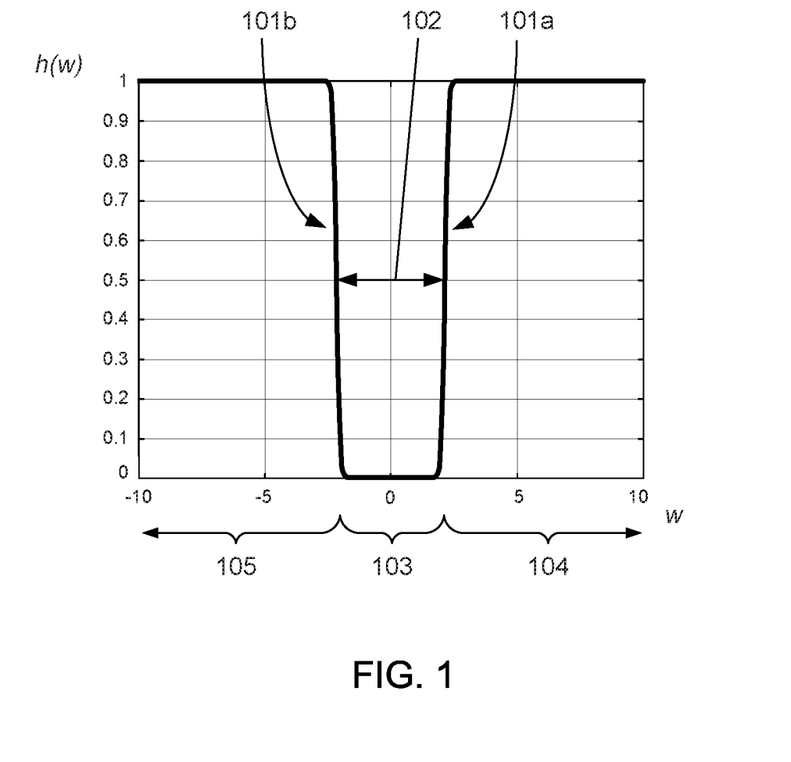
FIG. 1 depicts a graph of the example threshold function according to the subject matter disclosed herein.

FIG. 1 depicts a graph of the example threshold function of Eq. (3). The parameter $\alpha$ in Eq. (3) controls a sharpness of the edges 101a and 101b of the threshold function h(w), that is, the parameter $\alpha$ controls a rate of change of the edges 101a and 101b between h(w)=0 and h(w)=1. The parameter $\beta$ in Eq. (3) controls a width 102 between the two edges 101a and 101b at h(w)=0.5. As depicted in FIG. 1, the threshold function h(w) has a value of 0 for a first set 103 of continuous weight values that are centered around 0. Additionally, the threshold function h(w) has a value of 1 for a second set 104 of continuous weight values that are greater than the first set 103 of continuous weight values, and has a value of 1 for a third set 105 of continuous weight values that are less than the first set 103 of weight values. The first edge 101a of the threshold function h(w) is between the first set 103 of continuous weight values and the second set 104 of continuous weight values. The second edge 101b is between the first set 103 of continuous weight values and the third set 105 of continuous weight values. The values of the threshold function h(w) transition between 0 and 1 in the regions of the first and second edges 101a and 101b. A sharpness of each of the first and second edges 101a and 101b as the threshold function h(w) transitions between 0 and 1 is based on a value of the parameter $\alpha$ (i.e., the sharpness of the edges 101a and 101b of the threshold function h(w)) and a distance 102 between the first and second edges 101a and 101b at h(w)=0.5 is based on a value of the parameter $\beta$.

A regularization term may be introduced to augment the loss function $$L = L_{net} + \rho \beta^2 \quad (4)$$

in which $\rho$ is a regularization parameter selected empirically. The loss function L will be minimized to optimize the sparsification, or balance, of the pruning of the DNN model.

Figure 2:
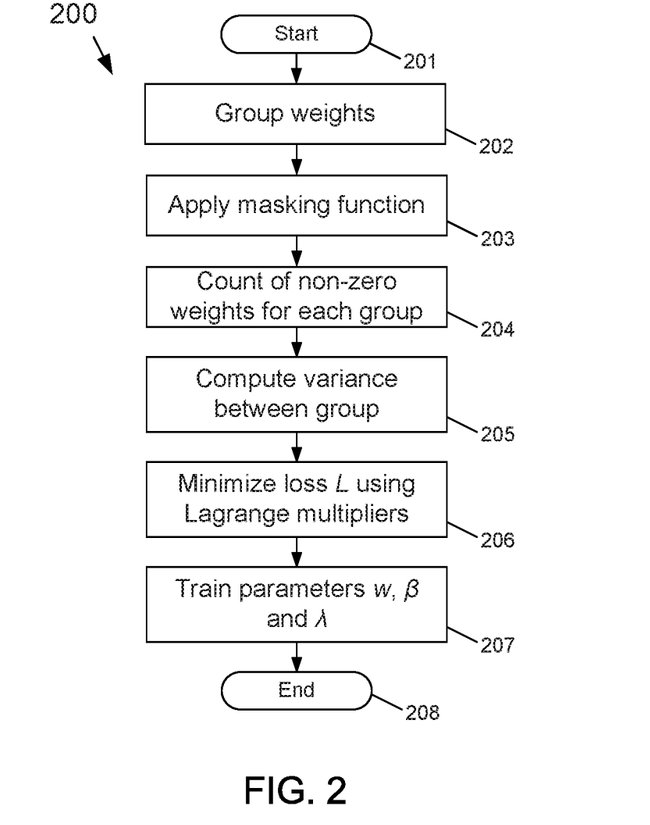
FIG. 2 is a flow diagram for a method for a balanced self-pruning of a DNN according to the subject matter disclosed herein.

FIG. 2 is a flow diagram for a method 200 for a balanced self-pruning of a DNN according to the subject matter disclosed herein. The method 200 begins at 201. To distribute the sparse weights to multiple processing elements (PE), the weights of the DNN are partitioned into groups at 202.

Within each group, the number of non-zero weights should be the same. An analytical masking function m(w) with a form similar to Eq. (3) may be applied to the weights of the DNN. For example, the masking function of Eq. (5) may be used.

$$m(w) = \frac{1}{1 + \frac{\exp(-\beta^2 w^2)}{\alpha^2}}. \quad (5)$$

The masking function of Eq. (5) returns 1 if the magnitude of the weight is greater that the threshold and 0 if the magnitude of the weight is less than the threshold. The functions of Eq. (3) and Eq. (5) are differentiable and, therefore, the function parameters are trainable. At 203, after application of the masking function, a count the number of non-zero weights within each group may be determined at 204, which is the sum of the return value of masking functions:

$$N_{\neq 0} = \Sigma_i m(w_i), \quad (6)$$

in which i is an index of the weights within a group.

In order for all the groups to have the same number of non-zero weights, the variance of $N_{\neq 0}$ should be zero. At 205, the variance of the count of the non-zero weights in each group is determined. At 206, the training problem may be formulated as a minimization problem with a hard constraint:

$$\underset{w,\beta}{\mathrm{argmin}}\{L\}, \text{ s.t. } \mathrm{Var}\{N_{\neq 0}\} = 0. \quad (7)$$

This minimization problem having a hard constraint may be solved using Lagrange multipliers, method of dual ascent, or alternating direction method of multipliers. In essence, the two terms in Eq. (7) may be connected using a Lagrange multipliers as:

$$\underset{w,\beta,\lambda}{\mathrm{argmin}}\{L + \lambda \mathrm{Var}(N_{\neq 0})\}. \quad (8)$$

At 207, the three parameters w, $\beta$, and $\lambda$ are trainable and updated in back-propagation. The parameters w and $\beta$ may be updated using a gradient-descent technique, whereas the Lagrange parameter may be updated using a gradient-ascent technique, such as $$\lambda_{t+1} \leftarrow \lambda_t + \eta \, \mathrm{Var}(N_{\neq 0})_t. \quad (9)$$

This strictly enforces the hard constraint in Eq. (7) because the overall loss in Eq. (8) is decreasing and the Lagrange multiplier $\lambda$ is increasing. The method ends at 208. Using the method 200 above, the training will eventually converge to a minima with an approximately balanced sparsity between groups.

To reach an exact balanced sparsity, a post-processing method may be applied. After balanced self-pruning (i.e., FIG. 2), the number of non-zero weights may have a partially sparse pattern. The post-processing process may be applied to selectively set the mask of the fringe weights to be 0 or to be 1 to achieve exact sparsity balance.

Figure 3:
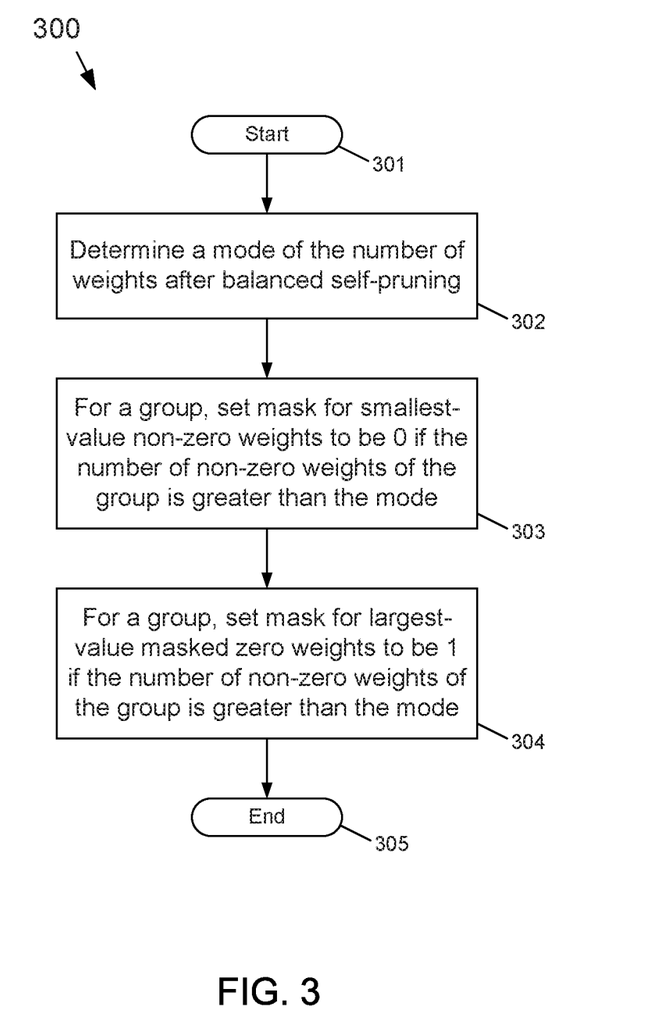
FIG. 3 is a flow diagram of an example embodiment of a post-processing method according to the subject matter disclosed herein.

FIG. 3 is a flow diagram of an example embodiment of a post-processing method 300 according to the subject matter disclosed herein. The method 300 starts at 301, which may be at the end 208 of the method 200 in FIG. 2. At 302, for example, consider that at 202 in FIG. 2 the total number of weights per group equals 1024. The outcome after balanced self-pruning at 207 may be that most groups have a mode of 500 non-zero weights, whereas in some groups the weights may all be zero. At 303, to achieve exact sparsity balance, if a group has more non-zero weights than the mode, the mask for the smallest-value non-zero weights of that group will be set to 0 until the number of non-zero weights for the group equals the mode. At 304, if a group has fewer non-zero weights than the mode, the largest-value (masked) zero weights are reset (i.e., unmasked) to be non-zero until the number of non-zero weights for the group equals the mode. Post-processing is possible because the weights are masked using a soft masking function, such as that in Eq. (5). The method 300 ends at 305.

Figure 4:
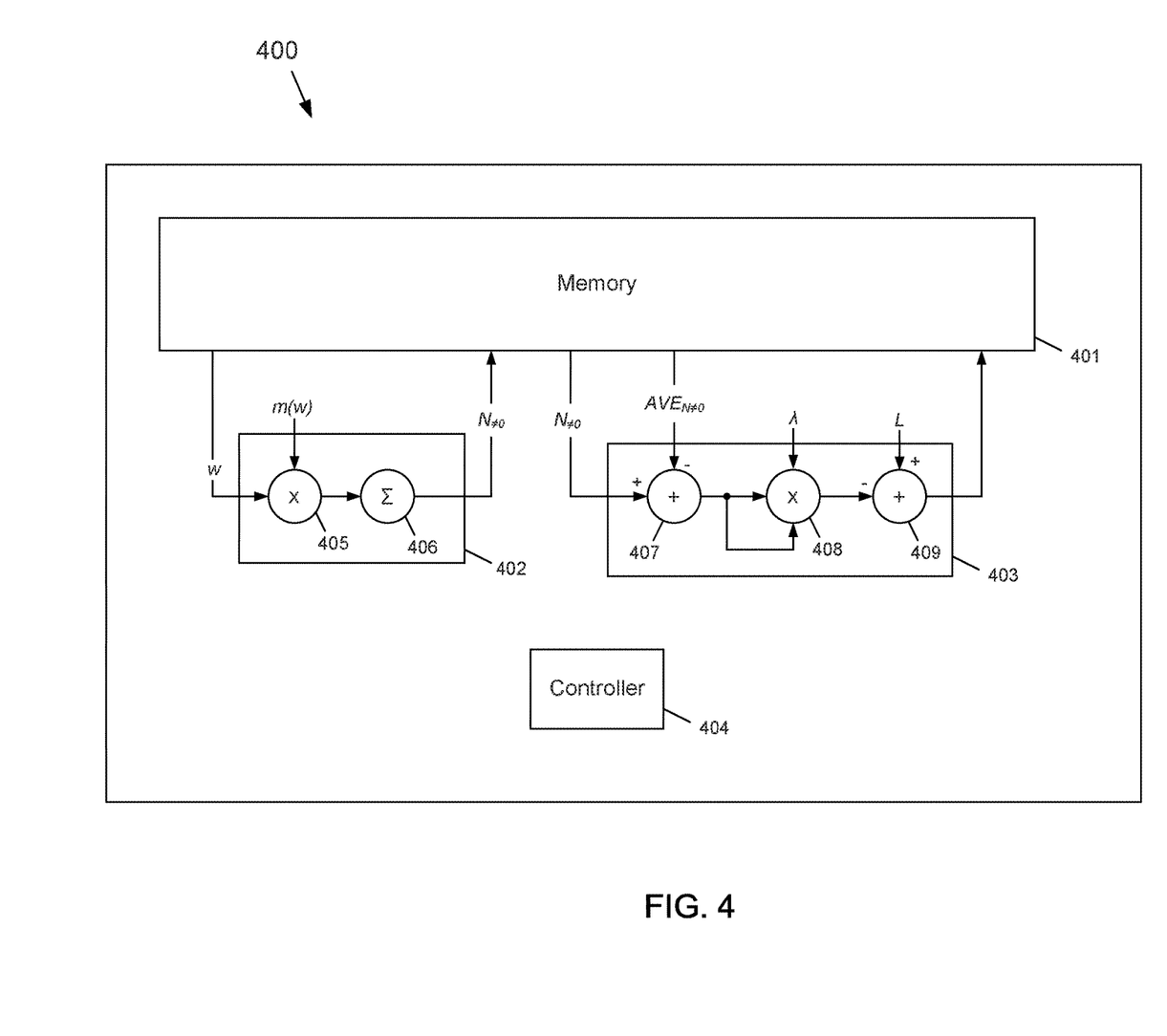
FIG. 4 depicts an example embodiment of a balanced self-pruner according to the subject matter disclosed herein.

FIG. 4 depicts an example embodiment of a balanced self-pruner 400 according to the subject matter disclosed herein. The balanced self-pruner 400 may include a memory 401, a masker 402 and a loss determiner 403. In some embodiments, the balanced self-pruner 400 may include a controller 404 that may provide control and an iterative-type of functionality. In another embodiment, the balanced self-pruner 400 may be embodied as a state machine. In one embodiment, the balanced self-pruner 400 may be embodied as a minimization module that may be any combination of software, firmware and/or hardware configured to provide the minimization and arithmetic functionality of the balanced self-pruner 400. In another embodiment, one or more of the functional blocks of the balanced self-pruner 400 may be modules, in which case such a module may be any combination of software, firmware and/or hardware configured to provide the functionality described herein in connection with the particular module.

The memory 401 may store weights w of a DNN that are to be self-pruned, in addition to interim values generated by the masker 402 and loss determiner 403. The weights w may be grouped in the memory 401. The masker 402 may include a first multiplier 405 that receives a weight w and the masking function m(w) as inputs. The output of the first multiplier 405 is summed in a first adder 406 to determine a count of non-zero weights in a group. The output of the masker 402 may be stored in the memory 401. The masker 401 may operate in an iterative manner so that the masking function m(w) is applied to each weight of each group of weights.

The loss determiner 403 may include a second adder 407, a second multiplier 408 and a third adder 409. The second adder 407 receives the count of non-zero weights in a group as an input and subtracts the average count value of all of the groups. The output of the second adder 407 is input to the second multiplier 408. The second multiplier squares the output of the second adder 408 and multiplies that product by the Lagrange multiplier $\lambda$. The output of the second adder 408 is subtracted from the loss L of the network and stored in the memory 401 for evaluation to minimize the loss L. Post-processing may utilize the masker 402 to achieve exact sparsity balance.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system to provide balanced pruning of weights of a deep neural network (DNN), the system comprising:
a weight masker configured to mask weights in each group of weights of a plurality of weight groups of the DNN to generate a mask for each group of weights in which non-zero weights are represented by 1 and zero weights are represented by 0, a number of weights in each weight group being equal to a same predetermined number, and the weight masker generating a count for each group of non-zero weights in the group; and
a loss determiner configured to determine a loss of the DNN based on a network loss of the DNN minus a variance of counts of non-zero weights of the plurality of weight groups.

2. The system of claim 1, wherein the loss determiner is further configured to determine the loss of the DNN based on the network loss of the DNN minus the variance of counts of non-zero weights of the plurality of weight groups multiplied by a Lagrange multiplier.

3. The system of claim 2, wherein the weight masker is further configured to multiply weights in each group of weights by a masking function to generate the mask for each group.

4. The system of claim 3, wherein the masking function is differentiable.

5. The system of claim 4, wherein a sharpness of the masking function is selectably controllable, and a width of the masking function is selectably controllable.

6. A method to provide balanced pruning of weights of a deep neural network (DNN), the method comprising:
partitioning weights of the DNN into a plurality of groups, each group comprising a same predetermined number of weights;
applying by a weight masker a masking function to weights in each group, the masking function returning a value of 1 for a weight based on the weight being greater than a threshold and returning a value of 0 based on the weight being less than the threshold;
determining a count of a number of non-zero weights in each group after the masking function has been applied to the weights in each group, the count of non-zero weights in each group comprising a sum of values returned for the group;
determining a variance of the count of non-zero weights in each group;
minimizing by a loss determiner a loss function having a hard constraint using a Lagrange multiplier so that the variance of counts of non-zero weights in each group equals to 0; and
retraining the weights and the Lagrange multiplier by back-propagation.

7. The method of claim 6, wherein the Lagrange multiplier is used to multiply the variance of the counts of non-zero weights in each group.

8. The method of claim 6, further comprising:
determining a mode value of non-zero weights of the retrained weights for the plurality of groups; and
for each group of retrained weights:
setting a mask value to 0 for a smallest value non-zero weight having a mask value of 1 based on the group having more non-zero weights than the mode value until a count of non-zero weights of the group equals the mode value; and
setting a mask value to 1 for a largest value non-zero weight having a mask value of 0 based on the group having fewer non-zero weights than the mode value until a count of non-zero weights of the group equals the mode value.

9. The method of claim 6, wherein the masking function is differentiable.

10. The method of claim 9, wherein a sharpness of the masking function is selectably controllable, and a width of the masking function is selectably controllable.

11. The method of claim 6, wherein retraining further comprises retraining the weights, a width of the masking function, and the Lagrange multiplier by back-propagation.

12. The method of claim 11, wherein the retraining of the weights and the width of the masking function are updated using a gradient-descent technique, and the Lagrange multiplier is updated using a gradient-ascent technique.

13. The system of claim 2, wherein the weights and the Lagrange multiplier are retrained by back-propagation, and wherein for each group, the weight masker is further configured to:
- set a mask value to 0 for a smallest value non-zero weight having a mask value of 1 based on the group having more non-zero weights that a mode value of non-zero weights of retrained weights for the plurality of groups until a count of non-zero weights of the group equals the mode value, and
- set a mask value to 1 for a largest value non-zero weight having a mask value of 0 based on the group having fewer non-zero weights than the mode value until a count of non-zero weights of the group equals the mode value.

* * * * *